United States Patent
Galvan et al.

(10) Patent No.: US 9,487,649 B2
(45) Date of Patent: Nov. 8, 2016

(54) PROPYLENE-BASED TERPOLYMERS COMPOSITION FOR PIPES

(71) Applicant: Basell Poliolefine Italia S.r.l., Milan (IT)

(72) Inventors: Monica Galvan, Ferrara (IT); Giampaolo Pellegatti, Ferrara (IT); Herbert Terwyen, Hochheim (DE); Claudio Cavalieri, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 379 days.

(21) Appl. No.: 14/362,564

(22) PCT Filed: Dec. 5, 2012

(86) PCT No.: PCT/EP2012/074477
§ 371 (c)(1),
(2) Date: Jun. 3, 2014

(87) PCT Pub. No.: WO2013/083617
PCT Pub. Date: Jun. 13, 2013

(65) Prior Publication Data
US 2014/0349051 A1    Nov. 27, 2014

Related U.S. Application Data

(60) Provisional application No. 61/567,427, filed on Dec. 6, 2011, provisional application No. 61/625,408, filed on Apr. 17, 2012.

(30) Foreign Application Priority Data

Dec. 5, 2011    (EP) .................................... 11191865
Apr. 17, 2012    (EP) .................................... 12164355

(51) Int. Cl.
| | |
|---|---|
| *C08L 23/18* | (2006.01) |
| *B32B 27/32* | (2006.01) |
| *C08L 23/14* | (2006.01) |
| *B32B 1/08* | (2006.01) |
| *F16L 9/127* | (2006.01) |

(52) U.S. Cl.
CPC .................. *C08L 23/18* (2013.01); *B32B 1/08* (2013.01); *B32B 27/32* (2013.01); *C08L 23/14* (2013.01); *C08L 23/142* (2013.01); *F16L 9/127* (2013.01); *B32B 2597/00* (2013.01); *C08L 2203/18* (2013.01); *C08L 2205/025* (2013.01); *C08L 2207/02* (2013.01); *Y10T 428/139* (2015.01); *Y10T 428/1393* (2015.01)

(58) Field of Classification Search
CPC ...... C08L 23/18; C08L 23/14; C08L 23/142; C08L 2203/18; C08L 2205/025; C08L 2207/02; Y10T 428/1393; Y10T 428/139; B32B 1/08; B32B 2597/00; B32B 27/32; F16L 9/127
See application file for complete search history.

(56) References Cited

U.S. PATENT DOCUMENTS 6,743,864 B2    6/2004    Glogovsky et al.

FOREIGN PATENT DOCUMENTS

| EP | 2186834 A1 | 5/2010 |
|---|---|---|
| RU | 2304154 C2 | 8/2007 |
| RU | 2009128224 A | 1/2011 |
| WO | WO2008077773 A1 | 7/2008 |
| WO | WO2011160945 A1 | 12/2011 |

OTHER PUBLICATIONS

PCT International Search Report & Written Opinion mailed Jan. 30, 2013, for PCT/EP2012/074477.

*Primary Examiner* — Michael C Miggins

(57) ABSTRACT

A polyolefin composition comprising:
A) from 85.0 wt % to 99.5 wt %; A terpolymer containing propylene, ethylene and 1-hexene wherein:
  (i) the content of 1-hexene derived units ranges from 1.0 wt % to 5.0%;
  (ii) the content of ethylene derived units is comprised between 0.5 wt % and 10.0 wt %
  (iii) the melting temperature ranges from 130° C. to 145° C.;
B) from 0.5 wt % to 10.0 wt %; of a propylene, ethylene copolymer composition comprising:
b1) from 12 wt % to 52 wt %; of a propylene homopolymer or a propylene/ethylene copolymer having a content of ethylene derived units ranging from 0.1 wt % to 4.5 wt %; and having a xylene soluble content measured at 25° C. lower than 10 wt %;
b2) from 48 wt % to 88 wt % of a propylene ethylene copolymer having a content of ethylene derived units ranging from 15.0 wt % to wt % to 42.0 wt %;
wherein the resulting polyolefin composition has an melt flow rate (230° C./5 kg. ISO 1133) ranging from 0.2 g/10 min to 4.0 g/10 min; the sum A+B being 100 and the sum b1+b2 being 100.

8 Claims, No Drawings

PROPYLENE-BASED TERPOLYMERS COMPOSITION FOR PIPES

This application is the U.S. National Phase of PCT International Application PCT/EP2012/074477, filed Dec. 5, 2012, claiming benefit of priority to European Patent Application No. 11191865.2, filed Dec. 5, 2011 and European Patent Application No. 12164355.5, filed Apr. 17, 2012, and benefit of priority under 35 U.S.C. §119(e) to U.S. Provisional Patent Application No. 61/567,427 filed Dec. 6, 2011 and U.S. Provisional Patent Application No. 61/625,408, filed Apr. 17, 2012, the contents of which are incorporated herein by reference in their entirety.

FIELD OF THE INVENTION

The present invention relates to a composition comprising a propylene/ethylene/1-hexene terpolymer and an heterophasic propylene ethylene copolymer particularly fit for the production of pipes especially for small diameter pipes.

BACKGROUND OF THE INVENTION

Propylene/ethylene/1-hexene terpolymers are already known in the art for the production of pipes. For example WO2006/002778 relates to a pipe system comprising a terpolymer of propylene/ethylene and alpha olefin wherein the ethylene content is from 0 to 9% by mol, preferably from 1 to 7% by mol and the 1-hexene content ranges from 0.2 to 5% wt.

When small diameter pipes are needed it is important to have limited wall thickness of the pipe. This allows to obtain pipes containing less material and above all to improve the efficiency of the pipe in terms of feed due to the higher internal diameter. However when the wall thickness become small the pipe could become brittle, thus it is necessary to use a material having high impact resistance, especially at low temperature.

The applicant found that it is possible to select from these ranges a composition having improved properties in particular improved impact properties to be used for small diameter pipes.

SUMMARY OF THE INVENTION

Thus an object of the present inventions is a polyolefin composition comprising:
A) from 85.0 wt % to 99.5 wt %; preferably 90.0 wt % to 99.5 wt % more preferably from 99.5 wt % to 93.0 wt %; even more preferably from 96.5 wt % to 94.0 wt % of a terpolymer containing propylene, ethylene and 1-hexene wherein:
  (i) the content of 1-hexene derived units ranges from 1 wt % to 5 wt %;
  (ii) the content of ethylene derived units is comprised between 0.5 wt % and 10 wt %
  (iii) the melting temperature ranges from 130° C. to 145° C.;
B) from 0.5 wt % to 15 wt %; preferably from 0.5 wt % to 10.0 wt %; more preferably from 0.5 wt % to 7.0 wt %; even more preferably from 3.5 wt % to 4. wt % of a propylene, ethylene copolymer composition comprising:
b1) from 12 wt % to 52 wt %; preferably from 15 wt % to 43 wt %; more preferably from 20 wt % to 33 wt % of a propylene homopolymer or a propylene/ethylene copolymer having a content of ethylene derived units ranging from 0.1 wt % to 4.5 wt %; and having a xylene soluble content measured at 25° C. lower than 10 wt %; preferably lower than 8 wt %; more preferably lower than 7 wt %;
b2) from 48 wt % to 88 wt % preferably from 57 wt % to 85 wt %; more preferably from 67 wt % to 80 wt % of a propylene ethylene copolymer having a content of ethylene derived units ranging from 15 wt % to wt % to 42 wt %; wherein the resulting polyolefin composition has an melt flow rate (230° C./5 kg. ISO 1133) ranging from 0.2 g/10 min to 4.0 g/10 min; preferably from 0.4 g/10 min to 3.0 g/10 min; more preferably from 0.5 g/10 min to 2 g/10 min; the sum A+B being 100 and the sum b1+b2 being 100.

DETAILED DESCRIPTION OF THE INVENTION

Preferably the component A) is endowed with one or more of these features:
(i) the content of 1-hexene derived units ranges from 1.0 wt % to 4.5 wt %; preferably from 1.1 wt % to 4.1 wt %; more preferably from 1.5 wt % to 3.5 wt %; even more preferably from 1.6 wt % to 3.1 wt %; even more preferably from 1.8 wt % to 2.6 wt %; such as 1.8-2.4 wt %;
(ii) the content of ethylene derived units is higher than 1.4 wt % preferably higher than 1.5 wt % even more preferably higher than 1.6 wt % and fulfils the following relation (1):

$$C2 < C6 - 0.2 \quad (1)$$

wherein C2 is the content of ethylene derived units wt % and C6 is the content of 1-hexene derived units wt %; preferably the relation (1) is $C2<C6-0.3$; more preferably $C2<C6-0.5$;
(iii) the melt flow rate (MFR) (ISO 1133 230° C., 5 kg) ranges from 0.1 to 3.9 g/10 min; preferably from 0.5 to 1.9 g/10 min;
(iv) the melting temperature ranging from 130° C. to 138° C.; preferably from 132° C. to 136° C.

The terpolymers component A) have a stereoregularity of isotactic type of the propylenic sequences this is clear by the low value of xylene extractables that is lower than 10% wt: preferably lower than 8% wt; more preferably lower than 7% wt Preferably the terpolymer component A) has a polydispersity index (PI) ranges from 2.0 to 7.0, preferably from 3.0 to 6.5, more preferably from 3.5 to 6.0.

The crystallization temperature preferably ranges from 70° C. to 100° C., preferably from 80° C. to 97° C.; more preferably from 85° C. to 97° C.

In the component B) component b1) is preferably a propylene homopolymer or a propylene ethylene copolymer having an content of ethylene derived units ranging from 1.1 wt % wt % to 4.2 wt %; more preferably from 2.3 wt % to 3.9 wt %.

In the component B) component b2) is preferably a propylene ethylene copolymer having an content of ethylene derived units ranging from 18 wt % to 38 wt %; preferably from 21 wt % to 34 wt %, more preferably from 23 wt % to 31 wt %; said copolymer having an intrinsic viscosity of the xylene soluble fraction at 25° C. ranging from 2.0 dl/g to 5.0 dl/g; preferably from 2.5 dl/g to 4.5 dl/g.

With the terpolymer of the present invention it is possible to obtain pipes, in particular small diameters pipes having a particularly small wall thickness fit to be used even under pressure. Said pipes giving a results of 0 pipes broken every 10 at the impact test at −5° C. (ISO 9854).

Thus a further object of the present invention is a pipe comprising the terpolymer of the present invention.

The term "pipe" as used herein also includes pipe fittings, valves and all parts which are commonly necessary for e.g.

a hot water piping system. Also included within the definition are single and multilayer pipes, where for example one or more of the layers is a metal layer and which may include an adhesive layer.

Such articles can be manufactured through a variety of industrial processes well known in the art, such as for instance moulding, extrusion, and the like.

In a further embodiment of the invention, the composition of the present invention further comprises an inorganic filler agent in an amount ranging from 0.5 to 60 parts by weight with respect to 100 parts by weight of the said composition. Typical examples of such filler agents are calcium carbonate, barium sulphate, titanium bioxide and talc. Talc and calcium carbonate are preferred. A number of filler agents can also have a nucleating effect, such as talc that is also a nucleating agent. The amount of a nucleating agent is typically from 0.2 to 5 wt % with respect to the polymer amount.

The composition of the invention is also suitable for providing pipes with walls of any configuration other than those with smooth inner and outer surface. Examples are pipes with a sandwich-like pipe wall, pipes with a hollow wall construction with longitudinally extending cavities, pipes with a hollow wall construction with spiral cavities, pipes with a smooth inner surface and a compact or hollow, spirally shaped, or an annularly ribbed outer surface, independently of the configuration of the respective pipe ends.

Articles, pressure pipes and related fittings according to the present invention are produced in a manner known per se, e.g. by (co-)extrusion or moulding, for instance.

Extrusion of articles can be made with different type of extruders for polyolefin, e.g. single or twin screw extruders.

A further embodiment of the present invention is a process wherein the said composition is moulded into said articles.

When the pipes are multi-layer, at least one layer is made of the terpolymer described above. The further layer(s) is/are preferably made of an amorphous or crystalline polymer (such as homopolymer and co- or terpolymer) of R—CH=CH$_2$ olefins, where R is a hydrogen atom or a C$_1$-C$_6$ alkyl radical. Particularly preferred are the following polymers:
1) isotactic or mainly isotactic propylene homopolymers;
2) random co- and terpolymers of propylene with ethylene and/or C$_4$-C$_8$ α-olefin, such as 1-butene, 1-hexene, 1-octene, 4-methyl-1-pentene, wherein the total comonomer content ranges from 0.05% to 20% by weight, or mixture of said polymers with isotactic or mainly isotactic propylene homopolymers;
3) heterophasic polymer blends comprising (a) a propylene homopolymer and/or one of the co- and terpolymers of item (2), and an elastomeric moiety (b) comprising co- and terpolymers of ethylene with propylene and/or a C$_4$-C$_8$ α-olefin, optionally containing minor amounts of a diene, the same disclosed for polymer (2)(a); and
4) amorphous polymers such as fluorinated polymers, polyvinyl difluoride (PVDF) for example.

In multi-layer pipes the layers of the pipe can have the same or different thickness.

The composition of the present invention can be prepared by blending the various components A), b1) and b2) or by preparing component A) and blend this component with component B) prepared in a single polymerization process by sequential polymerization steps.

The polymerization of A) and B) can be carried out in the presence of Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminium compound, such as an aluminium alkyl compound.

An external donor is optionally added.

The catalysts generally used in the process of the invention are capable of producing polypropylene with a value of xylene insolubility at ambient temperature greater than 90%, preferably greater than 95%.

Catalysts having the above mentioned characteristics are well known in the patent literature; particularly advantageous are the catalysts described in U.S. Pat. No. 4,399,054 and European patent 45977. Other examples can be found in U.S. Pat. No. 4,472,524.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids.

Particularly suitable electron-donor compounds are esters of phtalic acid and 1,3-diethers of formula:

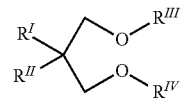

wherein R$^I$ and R$^{II}$ are the same or different and are C$_1$-C$_{18}$ alkyl, C$_3$-C$_{18}$ cycloalkyl or C$_7$-C$_{18}$ aryl radicals; R$^{III}$ and R$^{IV}$ are the same or different and are C$_1$-C$_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, said structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both.

Ethers of this type are described in published European patent applications 361493 and 728769.

Representative examples of said diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis(methoxymethyl) fluorene.

Other suitable electron-donor compounds are phthalic acid esters, such as diisobutyl, dioctyl, diphenyl and benzylbutyl phthalate.

The preparation of the above mentioned catalyst component is carried out according to various methods.

For example, a MgCl$_2$.nROH adduct (in particular in the form of spheroidal particles) wherein n is generally from 1 to 3 and ROH is ethanol, butanol or isobutanol, is reacted with an excess of TiCl$_4$ containing the electron-donor compound. The reaction temperature is generally from 80 to 120° C. The solid is then isolated and reacted once more with TiCl$_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds, which can be used for the preparation of the solid catalyst component, are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or SO$_4$ or SO$_3$ groups.

The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical.

Examples of silicon compounds are (tert-butyl)$_2$Si(OCH$_3$)$_2$, (cyclohexyl)(methyl)Si(OCH$_3$)$_2$, (cyclopentyl)$_2$Si(OCH$_3$)$_2$ and (phenyl)$_2$Si(OCH$_3$)$_2$ and (1,1,2-trimethylpropyl)Si(OCH$_3$)$_3$.

1,3-diethers having the formulae described above can also be used advantageously. If the internal donor is one of these diethers, the external donors can be omitted.

In particular, even if many other combinations of the previously said catalyst components may allow to obtain compositions according to the present invention, the components A9 and B) are preferably prepared by using catalysts containing a phthalate as internal donor and (cyclopentyl)$_2$Si(OCH$_3$)$_2$ as outside donor, or the said 1,3-diethers as internal donors.

Component A) is produced with a polymerization process illustrated in EP application 1 012 195.

In detail, the said process comprises feeding the monomers to said polymerisation zones in the presence of catalyst under reaction conditions and collecting the polymer product from the said polymerisation zones. In the said process the growing polymer particles flow upward through one (first) of the said polymerisation zones (riser) under fast fluidisation conditions, leave the said riser and enter another (second) polymerisation zone (downcomer) through which they flow downward in a densified form under the action of gravity, leave the said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it become to possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, preferably from 2 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The control of the polymer circulating between the two polymerisation zones can be effected by metering the amount of polymer leaving the downcomer using means suitable for controlling the flow of solids, such as mechanical valves.

The operating parameters, such as the temperature, are those that are usual in olefin polymerisation process, for example between 50 to 120° C.

This first stage process can be carried out under operating pressures of between 0.5 and 10 MPa, preferably between 1.5 to 6 MPa.

Advantageously, one or more inert gases are maintained in the polymerisation zones, in such quantities that the sum of the partial pressure of the inert gases is preferably between 5 and 80% of the total pressure of the gases. The inert gas can be nitrogen or propane, for example.

The various catalysts are fed up to the riser at any point of the said riser. However, they can also be fed at any point of the downcomer. The catalyst can be in any physical state, therefore catalysts in either solid or liquid state can be used.

The following examples are given to illustrate the present invention without limiting purpose.

EXAMPLES

Characterization Methods

Melting Temperature and Crystallization Temperature:
Determined by differential scanning calorimetry (DSC). weighting 6±1 mg, is heated to 220±1° C. at a rate of 20° C./min and kept at 220±1° C. for 2 minutes in nitrogen stream and it is thereafter cooled at a rate of 20° C./min to 40±2° C., thereby kept at this temperature for 2 min to crystallise the sample. Then, the sample is again fused at a temperature rise rate of 20° C./min up to 220° C.±1. The melting scan is recorded, a thermogram is obtained, and, from this, melting temperatures and crystallization temperatures are read.

Melt Flow Rate:
Determined according to the method ISO 1133 (230° C., 5 kg).

Solubility in Xylene:
Determined as follows.
2.5 g of polymer and 250 ml of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

1-Hexene and Ethylene Content:
Determined by $^{13}$C-NMR spectroscopy in terpolymers:
NMR Analysis.

$^{13}$C NMR spectra are acquired on an AV-600 spectrometer operating at 150.91 MHz in the Fourier transform mode at 120° C. The peak of the propylene CH was used as internal reference at 28.83. The $^{13}$C NMR spectrum is acquired using the following parameters:

| | |
|---|---|
| Spectral width (SW) | 60 ppm |
| Spectrum centre (O1) | 30 ppm |
| Decoupling sequence | WALTZ 65_64pl |
| Pulse program [1] | ZGPG |
| Pulse Length (P1) [2] | for 90° |
| Total number of points (TD) | 32K |
| Relaxation Delay [2] | 15 s |
| Number of transients [3] | 1500 |

The total amount of 1-hexene and ethylene as molar percent is calculated from diad using the following relations:

[P]=PP+0.5PH+0.5PE

[H]=HH+0.5PH

[E]=EE+0.5PE

Assignments of the $^{13}$C NMR spectrum of propylene/1-hexene/ethylene copolymers have been calculated according to the following table:

| Area | Chemical Shift | Assignments | Sequence |
|---|---|---|---|
| 1 | 46.93-46.00 | $S_{\alpha\alpha}$ | PP |
| 2 | 44.50-43.82 | $S_{\alpha\alpha}$ | PH |
| 3 | 41.34-4.23 | $S_{\alpha\alpha}$ | HH |
| 4 | 38.00-37.40 | $S_{\alpha\gamma} + S_{\alpha\delta}$ | PE |
| 5 | 35.70-35.0 | $4B_4$ | H |
| 6 | 35.00-34.53 | $S_{\alpha\gamma} + S_{\alpha\delta}$ | HE |
| 7 | 33.75 33.20 | CH | H |
| 8 | 33.24 | $T_{\delta\delta}$ | EPE |
| 9 | 30.92 | $T_{\beta\delta}$ | PPE |
| 10 | 30.76 | $S_{\gamma\gamma}$ | XEEX |
| 11 | 30.35 | $S_{\gamma\delta}$ | XEEE |
| 12 | 29.95 | $S_{\delta\delta}$ | EEE |
| 13 | 29.35 | $3B_4$ | H |
| 14 | 28.94-28.38 | CH | P |
| 15 | 27.43-27.27 | $S_{\beta\delta}$ | XEE |
| 16 | 24.67-24.53 | $S_{\beta\beta}$ | XEX |
| 17 | 23.44-23.35 | $2B_4$ | H |
| 18 | 21.80-19.90 | $CH_3$ | P |
| 19 | 14.22 | $CH_3$ | H |

Elongation at yield: measured according to ISO 527.
Elongation at break: measured according To ISO 527
Stress at break: measured according to ISO 527.
Impact test: ISO 9854
Samples for the mechanical analysis
Samples have been obtained according to ISO 294-2
Flexural Modulus
Determined according to ISO 178.
Tensile modulus
Determined according to ISO 527
Preparation of Component A)
Copolymers are prepared by polymerising propylene, ethylene and hexene-1 in the presence of a catalyst under continuous conditions in a plant comprising a polymerisation apparatus as described in EP 1 012 195.

The catalyst is sent to the polymerisation apparatus that comprises two interconnected cylindrical reactors, riser and downcomer. Fast fluidisation conditions are established in the riser by recycling gas from the gas-solid separator. In examples 1-5 no barrier feed has been used.

The catalyst employed comprises a catalyst component prepared by analogy with example 5 of EP-A-728 769 but using microspheroidal $MgCl_2.1.7C_2H_5OH$ instead of $MgCl_2.2.1C_2H_5OH$. Such catalyst component is used with dicyclopentyl dimethoxy silane (DCPMS) as external donor and with triethylaluminium (TEA).

The polymer particles exiting the reactor are subjected to a steam treatment to remove the reactive monomers and volatile substances and then dried. The main operative conditions and characteristics of the produced polymers are indicated in Table 1.

TABLE 1

| component | | A) |
|---|---|---|
| TEA/solid catalyst component, g/g | | 4 |
| TEA/DCPMS, g/g | | 4 |
| $C_6/(C_3 + C_6)$, mol/mol | Riser | 0.03 |
| $C_6/(C_3 + C_6)$, mol/mol | Downcomer | 0.038 |
| $C_2/(C_3 + C_2)$, mol/mol | Riser | 0.023 |
| $C_2/(C_3 + C_2)$, mol/mol | Downcomer | 0.0035 |

C2 ethylene; C3 propylene; C6 1-hexene

Properties of the obtained material has been reported in table 2:

TABLE 2

| | | Ex 1 |
|---|---|---|
| MFR 5 Kg/230° C. | g/10 min | 1.03 |
| C6-NMR | % | 2.6 |
| C2-NMR | % | 1.7 |
| X.S. | % | 6.6 |
| ISO Characterization | | |
| Flexural modulus 24 h | MPa | 830 |
| Tensile modulus 24 h | MPa | 750 |
| IZOD 0° C. 24 h | kJ/m2 | 8 |
| Stress at yield | % | 26 |
| Elongation at break | kJ/m2 | 360 |
| Tm | ° C. | 136 |
| Tc | ° C. | 93 |

Component B)
Components B) are two heterophasic polymers (B1 and B2) obtained by sequential gas phase polymerization, the features of the two polymers are reported on table 3

TABLE 3

| Component | | B1 | B2 |
|---|---|---|---|
| Component b1 | | | |
| Split | % wt | 24 | 32 |
| C2 | % wt | 0 | 3.2 |

TABLE 3-continued

| Component | | B1 | B2 |
|---|---|---|---|
| Xylene solubles at 25° C. | % wt | <3 | <6.5 |
| Component b2 | | | |
| Split | % wt | 76 | 68 |
| C2 | % wt | 28.0 | 27.0 |
| intrinsic viscosity of the xylene soluble fraction at 25° C. | wt % | 4.2 | 3.2 |

* C2 = ethylene derived units

Component A and B have been blended together at various percentages the resulting blends have been analysed. The results have been reported on table 4

TABLE 4

| | | blend | | | | | | |
|---|---|---|---|---|---|---|---|---|
| | | 1 | 2 | 3 | 4 | 5 | 6 | C1 |
| | | Component | | | | | | |
| | | B1 | B1 | B1 | B2 | B2 | B2 | |
| Split* | wt % | 1 | 3 | 5 | 1 | 3 | 5 | |
| MFR | g/10 min | 0.64 | 0.68 | 0.66 | 0.6 | 0.63 | 0.64 | 0.74 |
| Stress at break | % | 34.1 | 33.9 | 33.4 | 34.1 | 35 | 34.8 | 34.7 |
| Elongation at break | % | 394 | 391 | 365 | 394 | 385 | 375 | 400 |
| Melting point | ° C. | 135.4 | 135.5 | 136.1 | 136.1 | 135.9 | 135.8 | 137.5 |
| Flexural modulus | MPa | 920 | 890 | 870 | 940 | 900 | 870 | 910 |
| IZOD | kJ/m2 | 7.9 | 8.6 | 11.4 | 7.5 | 12.9 | 13.6 | 7.6 |

*The remaining amount being component A

C1 is the comparative example the features are reported on table 5.

Blends 3 and 6 have been extruded to pipes with an outer diameter of 22 mm and a wall thickness of 2.8 mm have been produced and tested to Impact test at −5° C. The results were 0 of 10 broken. The blend of comparative example C1 has been extruded to pipes with an outer diameter of 22 mm and a wall thickness of 2.8 mm have been produced and tested to Impact test at −5° C. The results were 10 of 10 broken Comparative Example C1

Comparative example C1 is a blend of a propylene/ethylene/1-hexene terpolymer and a propylene/ethylene copolymer. The features of the component and the blend are reported on table 5.

TABLE 5

| C1 | | Terpolymer | Copolymer |
|---|---|---|---|
| Xylene solubles at 25° C. | % | <5.0 | 5.5 |
| Intrinsic Viscosity | dl/g | nm | 3 |
| 1 hexene Content | % wt | 2.6 | — |
| Ethylene Content | % wt | 1 | 10 |
| MFR 230° C.-5 Kg | g/10 min | 1 | 1 |
| Split | | 90 | 10 |

Nm = not measured

What is claimed is:

1. A polyolefin composition comprising:
   A) from 85.0 to 99.5 wt. %, based upon the total weight of the polyolefin composition, of a terpolymer, wherein the terpolymer contains propylene, ethylene and 1-hexene derived units wherein:
      (i) the content of 1-hexene derived units ranges from 1.0 to 5.0 wt. %, based upon the total weight of the terpolymer;
      (ii) the content of ethylene derived units is comprised between 0.5 and 10.0 wt. %, based upon the total weight of the terpolymer
      (iii) the melting temperature ranges from 130° C. to 145° C.;
   B) from 0.5 to 15.0 wt. %, based upon the total weight of the polyolefin composition, of a copolymer comprising propylene and ethylene derived units, wherein the copolymer composition comprises:
      b1) from 12 to 52 wt. %, based upon the total weight of the copolymer, of a propylene homopolymer or a propylene/ethylene copolymer having a content of ethylene derived units ranging from 0.1 to 4.5 wt. %; and having a xylene soluble content measured at 25° C. lower than 10 wt. %;
      b2) from 48 to 88 wt. %, based upon the total weight of the copolymer, of a propylene ethylene copolymer having a content of ethylene derived units ranging from 15.0 to 42.0 wt. %;
   wherein the polyolefin composition has an melt flow rate (230° C./5 kg. ISO 1133) ranging from 0.2 g/10 min to 4.0 g/10 min; the sum A+B being 100 and the sum b1+b2 being 100.

2. The polyolefin composition according to claim 1 wherein component A) ranges from 90.0 to 99.5 wt. % and component B) ranges from 0.5 to 10.0 wt. %.

3. The polyolefin composition according to claim 1 wherein the content of 1-hexene derived units in component A) ranges from 1.0 to 4.5 wt. %, and the content of ethylene derived units is higher than 1.5 wt. % and fulfils the following relation (1):

$$C2 < C6 - 0.2 \qquad (1)$$

wherein C2 is the content of ethylene derived units wt. % and C6 is the content of 1-hexene derived units wt. %.

4. The polyolefin composition according to claim 1 wherein component b2) is a propylene ethylene copolymer having an content of ethylene derived units ranging from 18 to 38 wt. % said copolymer having an intrinsic viscosity of the xylene soluble fraction at 25° C. ranging from 2.0 dl/g to 5.0 dl/g.

5. The polyolefin composition according to claim 1 wherein the melt flow rate (MFR) (ISO 1133 230° C., 2.16 kg) ranges from 0.4 to 13 g/10 min.

6. An article comprising a polyolefin composition, wherein the polyolefin compositions comprises:
A) from 85.0 to 99.5 wt. %, based upon the total weight of the polyolefin composition, of a terpolymer, wherein the terpolymer contains propylene, ethylene and 1-hexene derived units wherein:
  (i) the content of 1-hexene derived units ranges from 1.0 to 5.0 wt. %, based upon the total weight of the terpolymer;
  (ii) the content of ethylene derived units is comprised between 0.5 and 10.0 wt. %, based upon the total weight of the terpolymer
  (iii) the melting temperature ranges from 130° C. to 145° C.;
B) from 0.5 to 15.0 wt. %, based upon the total weight of the polyolefin composition, of a copolymer comprising propylene and ethylene derived units, wherein the copolymer composition comprises:
  b1) from 12 to 52 wt. %, based upon the total weight of the copolymer, of a propylene homopolymer or a propylene/ethylene copolymer having a content of ethylene derived units ranging from 0.1 to 4.5 wt. %; and having a xylene soluble content measured at 25° C. lower than 10 wt. %;
  b2) from 48 to 88 wt. %, based upon the total weight of the copolymer, of a propylene ethylene copolymer having a content of ethylene derived units ranging from 15.0 to 42.0 wt. %;
wherein the polyolefin composition has an melt flow rate (230° C./5 kg. ISO 1133) ranging from 0.2 g/10 min to 4.0 g/10 min; the sum A+B being 100 and the sum b1+b2 being 100,
wherein the article is a pipe or a sheet.

7. The article of claim 6, wherein the pipe is a mono- or multilayer layer structure, and wherein the mono-layer or at least one layer of the multilayer structure comprises the polyolefin composition.

8. The article of claim 6, wherein the sheet is a mono-layer sheet or a multilayer sheet, and wherein the mono-layer or at least one layer of the multilayer structure comprises the polyolefin composition.

* * * * *